US006603766B1

(12) United States Patent
Zifroni et al.

(10) Patent No.: US 6,603,766 B1
(45) Date of Patent: Aug. 5, 2003

(54) APPARATUS AND METHOD FOR IMPLEMENTING AN ATM AAL2 COMBINED USE TIMER

(75) Inventors: Dovrat Zifroni, Shoham (IL); Eran Kirzner, Rishon Le-Zion (IL); Avi Hagai, Raanana (IL)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/495,412

(22) Filed: Jan. 31, 2000

(51) Int. Cl.[7] ............................................... H04L 12/56
(52) U.S. Cl. .................... 370/395.6; 370/395.1
(58) Field of Search .................. 370/395.6, 395.61, 370/395.1

(56) References Cited

PUBLICATIONS

Liu et al., "Packing Density Of Voice Trunking Using AAL2," 1999, Globecom p. 611–615.*
Makke et al., Performance of the AAL2 Protocol Within the UTRAN, 2002, IEEEE p. 92–100.*
Lo et al., "Method and Circuit for performing an ATM Cell", 2002, US Pat Pub.*
ITU–T I.363.2, Series 1: Integrated Services Digital Network, B–ISDN ATM Adaptation layer specification: Type 2 AAL, pp. i–42 (1997).
The ATM Forum Technical Committee, Circuit Emulation Service InterOperability Specification Version 2.0, pp. ii–93 (1997).
ITU–T I.363.1, Series 1: Integrated Services Digital Network, B–ISDN ATM Adaption layer specification: Type 1 AAL, pp. ii–41 (1996).

* cited by examiner

Primary Examiner—Ken Vanderpuye

(57) ABSTRACT

A system and a method of the present invention for implementing a combined use Timer_CU within an ATM transmitter. The ATM transmitter being able to handle a plurality of ATM channels, at least one of the channel being an ATM AAL2 channel. The ATM channels can provide ATM-cells at different traffic parameters, such as, for example, different cell or bit rate, priorities, and bursts. The system schedules channels in a first table by channel identifiers. Cyclical pointers to this first table advance (i) at every time slot, (ii) within a time slot, whereas (iii) CPS-Packets with one or more octets already packed wait at most the duration of a Timer_CU before being scheduled to be sent by CPS transmitter to ATM transmitter. Conveniently, the schedule scheme is based upon a scheduling table comprising of a plurality of time slots. CPS-Packets are multiplexed and packed to form a CPS_PDU, the CPS_PDU is submitted to a processor that handles the transmission of ATM cells, each CPS_PDU is converted to an ATM cell and transmitted to a communication channel during a single time slot. Therefore, Timer_CU ends when the ATM cell actually is transmitted.

23 Claims, 9 Drawing Sheets

-PRIOR ART-

-PRIOR ART-

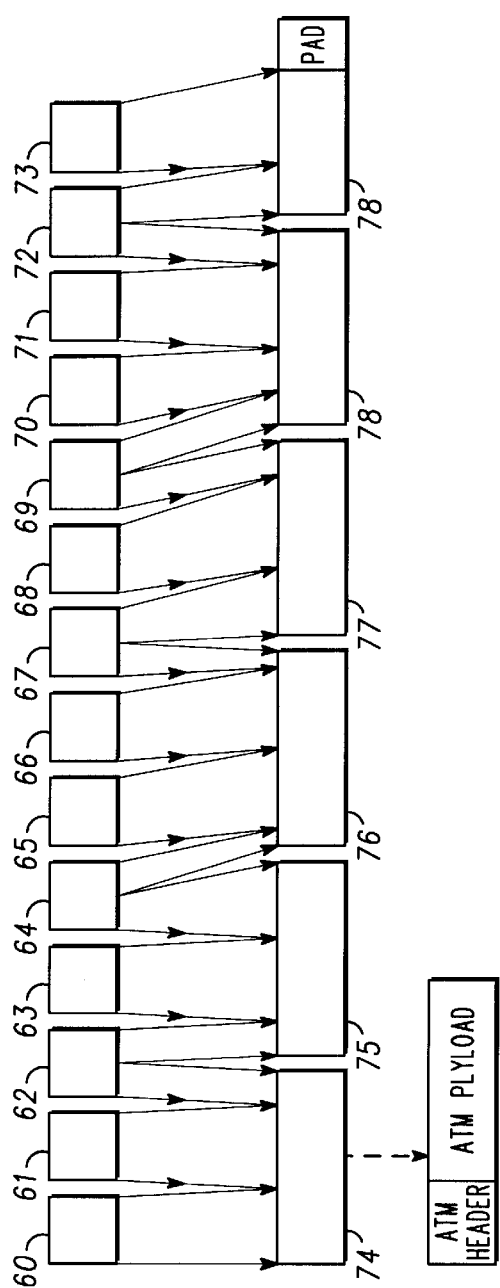
FIG. 3 —PRIOR ART—
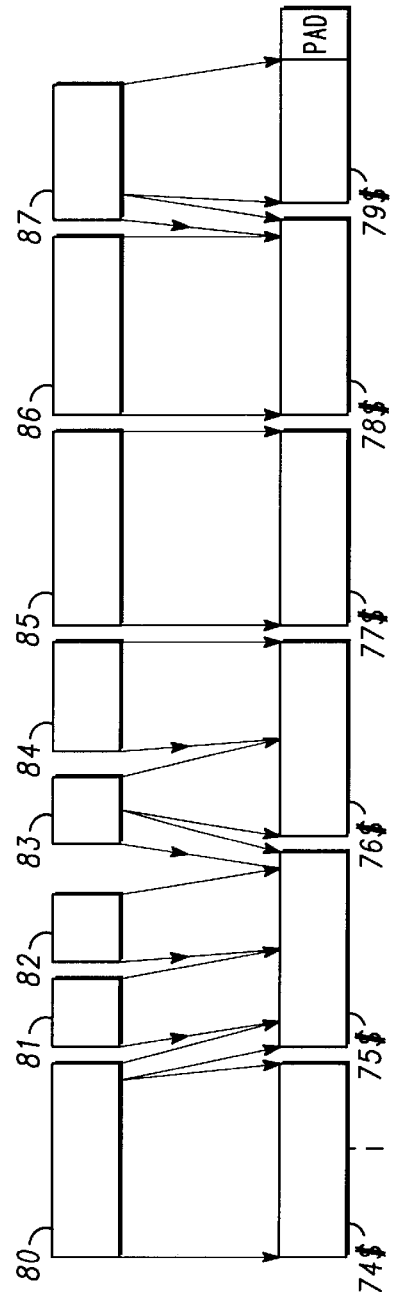
FIG. 4 —PRIOR ART—

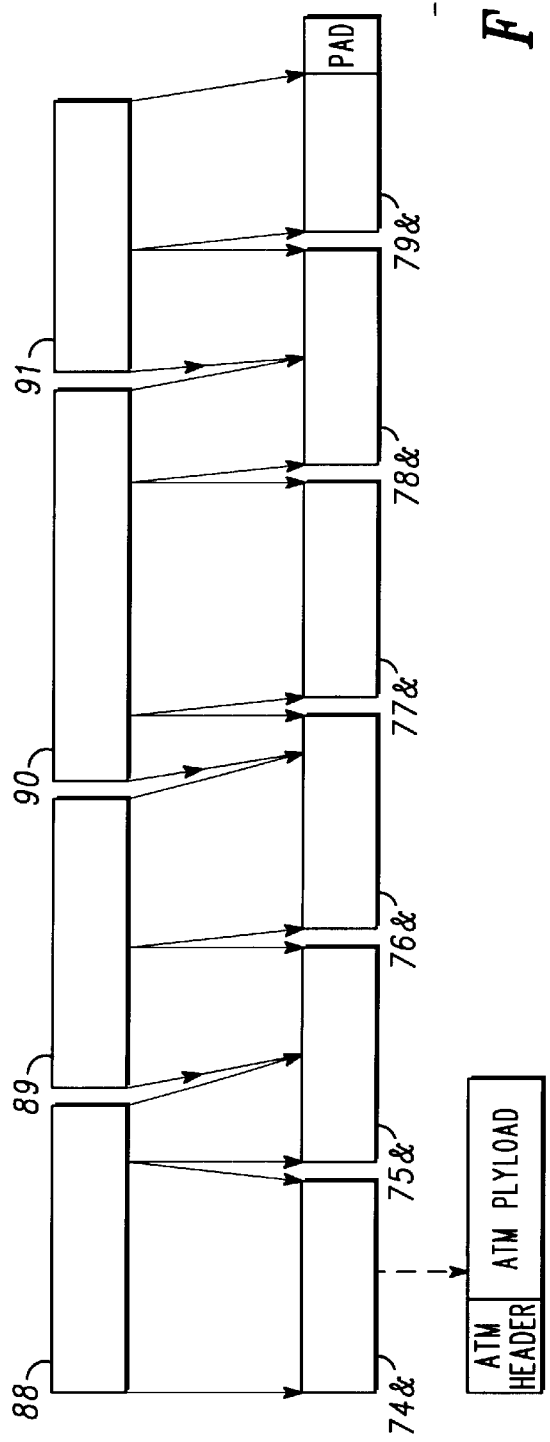
FIG. 5 —PRIOR ART—

US 6,603,766 B1

APPARATUS AND METHOD FOR IMPLEMENTING AN ATM AAL2 COMBINED USE TIMER

FIELD OF THE INVENTION

The present invention in general relates to apparatus and method for implementing an Asynchronous Transfer Mode (i.e.—ATM) Adaptation Layer type 2 (i.e.—AAL2) combined use timer. And especially a device and method for implementing an ATM AAL2 combined use timer in an ATM transmitter.

BACKGROUND OF THE INVENTION

Asynchronous Transfer Mode (ATM) has been accepted universally as the transfer mode of choice for Broadband Integrated Services Digital Networks (B-ISDN).

The services provided by ATM can be enhanced by providing ATM adaptation layers (AAL) that support functions required by a next higher communication layer. The next higher communication layer is accessed through a service access point. Referring to FIG. 1, an AAL entity 20 (21) receives information from an ATM layer entity, such as a point to point ATM layer connection 22, processes it and provides information through a service access point (i.e.—AAL-SAP) 23 (24) to the next higher communication layer and vice verse.

The Telecommunication Standardization Sector of the International Telecommunication Union (i.e.—ITU-T) has written several specifications defining several ATM adaptation layers. The specification of the ATM AAL2 can be found in recommendation I.363.2 of ITU-T. Recommendation I.363.2 was published during July 1997.

AAL2 provides for the bandwidth-efficient transmission of low-rate, short, and variable length packets in delay sensitive applications. AAL2 allows servicing multiple channels/users/services.

Referring to FIG. 2, An AAL2 layer is subdivided into a Common Part Sub-layer (CPS) 31 and a Service Specific Convergence Sub-layer (SSCS) 32. CPS 31 and SSCS 32 exchange primitives 33 that are defined in the I.363.2 recommendation. SSCS entities receive data from multiple sub-channels. Data originated from at least one SSCS entity form CPS-packets, CPS packets are multiplexed and packed to CPS-PDU cells, sent to ATM layer entities to be converted to ATM cells and to be transmitted over point to point ATM layer connection 22.

The terms "ATM AAL2 channel" or "AAL2 channel" refer to a single communication channel that provides either CPS-PDUs or ATM cells, whereas the CPS-PDUa and accordingly the ATM cells can comprise of a CPS-packets from a plurality of channels or sub-channels.

Each of the various data packets comprises of a control and/or status field, usually referred to as header, and a data field, referred to as payload. All data packets are formed of a plurality of octets. A CPS-packet has at least four octets; three forming a CPS packet header and the remaining octets form the CPS payload. A CPS-PDU consists of a single octet start field and 47 octet long payload. An ATM cell has a 5 octet long ATM header and an ATM payload. The 48 long CPS-PDU forms the ATM payload.

FIGS. 3–5 show examples of the multiplexing and packing of CPS packets to form CPS-PDUs that are converted to ATM cells. FIG. 3 shows the multiplexing and packing of 19 octet long CPS packets 60–73 to CPS-PDUs 74–79. FIG. 4 shows the multiplexing and packing of variable size CPS-packets 80–87 into CPS-PDUs 74$–79$. CPS-Packet 80 is 48 octet long. CPS-Packet 81 is 22 octet long. CPS-Packet 82 is 21 octet long. CPS-Packet 83 is 25 octet long. CPS-Packet 84 is 25 octet long. CPS-Packet 85 is 47 octet long. CPS-Packet 86 is 45 octet long. And CPS-Packet 87 is 37 octet long. FIG. 5 shown the multiplexing and packing of 67 octet long CPS-packets 88–91 into CPS-PDUs 74&–79&. FIGS. 3–5 illustrate that some CPS packets are split between two CPS-PDU. For example, CPS packet 62 is split between CPS-PDU 74 and 75, CPS packet 80 is split between CPS-PDUs 74$ and 75$, CPS packet 88 is split between CPS-PDU 74& and 75&. Furthermore, time constraints can force to fill a CPS-PDU with PAD octets. For example, if no further CPS-PDU arrives during a predetermined period after CPS-packet 91, CPS-PDU 79& is filled with PAD octets before it can be transmitted.

AAL2 is used in delay sensitive applications and there is a need to assure that the multiplexing and packing process does not delay the transmission of the CPS packet for a period that exceeds a threshold. This threshold is referred to as Timer_CU period in the I.363.2 recommendation. A CPS packet with one or more octets already packed wait at most the duration of Timer_CU period before being scheduled for transmission. The transmission takes place when the ATM transfer capability in force for the ATM connection allows the submission of a CPS_PDU for transmission. Each AAL2 channel can have its own threshold. Usually, an ATM entity can handle at least several thousands channels and each channel can have its own threshold.

CPS-PDUs are submitted to the ATM entity by a CPS entity referred to as a CPS transmitter. The CPS transmitter is modeled as a state machine, and its various states are defined in the I.363.2 recommendations. Generally speaking the CPS transmitter has four states: IDLE, PART, FULL and SEND. In IDLE state the CPS-PDU is empty and the Timer_CU period is not measured. In PART state some CPS-packet information is stored in the CPS-PDU and there is room for more, during the state the Timer_CU period is measured. In FULL state the CPS-PDU is full. If the last CPS packet overlaps into the next CPS-PDU Timer_CU period is measured. In SEND state Timer_CU period has but the CPS transmitter waits for a layer management within the ATM entity to allow the submission of the CPS-PDU for transmission.

The CPS transmitter operation is based upon a combined use Timer_CU that assures that CPS-Packets with one or more octets already packed wait at most the duration of a Timer_CU period before being submitted for transmission. Each channel has its own Timer_CU period, and there is a need to perform large amount of real time calculations and measurements in order to determine when the various Timer_CU period have expired.

There is a need to provide a device and a method for performing real time Timer_CU period measurements.

Usually, ATM entities deal with a plurality of communication channels, whereas only a part of them are ATM AAL2 channels. There is a need to provide a method and device for integrating the scheduling scheme of ATM AAL2 channels with the scheduling scheme of other channels.

BRIEF DESCRIPTION OF THE DRAWINGS

While the invention is pointed out with particularity in the appended claims, other features of the invention are disclosed by the following detailed description taken in conjunction with the accompanying drawings, in which:

FIGS. 3–5 are simplified diagrams illustrating by way of examples how the AAL2 entity of FIG. 1 multiplexes and packs CPS packets to form CPS-PDUs.

DETAILED DESCRIPTION OF THE DRAWINGS

Figure 1:
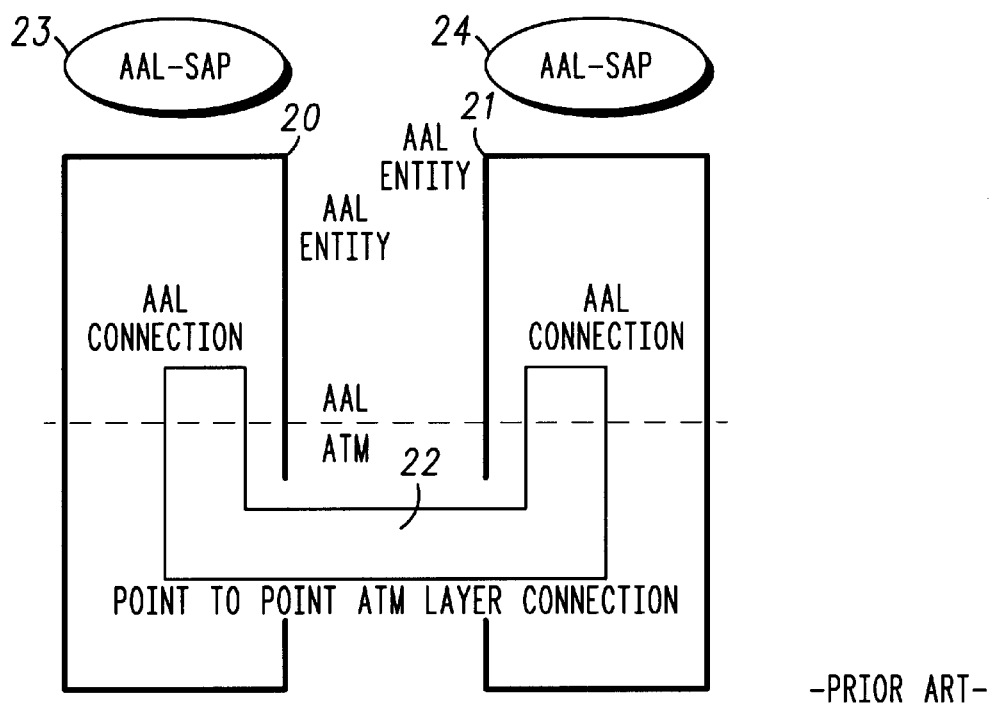
FIG. 1 is a schematic description of an AAL2 connection.
Figure 2:
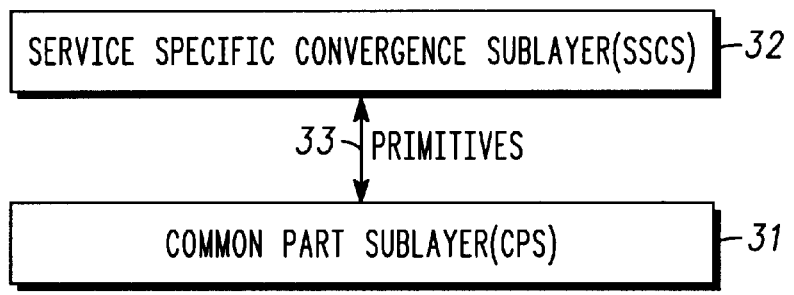
FIG. 2 is a schematic description of a structure of an AAL2 layer.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides a system and a method of the present invention for implementing a combined use Timer_CU within an ATM transmitter. The ATM transmitter being able to handle a plurality of ATM channels, at least one of the channel being an ATM AAL2 channel. The ATM channels can provide ATM-cells at different traffic parameters, such as, for example, different cell or bit rate, priorities, and bursts. The system schedules channels in a first table by channel identifiers. Cyclical pointers to this first table advance (i) at every time slot, (ii) within a time slot, whereas (iii) CPS-Packets with one or more octets already packed wait at most the duration of a Timer_CU period before being scheduled to be sent by CPS transmitter to ATM transmitter. Conveniently, the schedule scheme is based upon a scheduling table comprising of a plurality of time slots. CPS-Packets are multiplexed and packed to form a CPS_PDU, the CPS_PDU is submitted to a processor that handles the transmission of ATM cells, each CPS_PDU is converted to an ATM cell and transmitted to a communication channel during a single time slot. Therefore, Timer_CU period ends when the ATM cell actually is transmitted.

Thereby, the cyclical pointers scan the first table. If the system identifies a channel then it reads traffic parameters of that channel from a second table and couples that channels to the communication line. The system updates the first table by re-scheduling the next data transmission according to the traffic parameters for later time slots. The entries of the current time slot are obtained from a link field of the second table.

In one embodiment of the invention the first table can be accessed by a processor that handles the scheduling and the transmission of ATM cells. Conveniently the CPS transmitter is implemented by software being executed by the processor. The multiplexing and packing is conveniently performed by a multiplexing and packing unit which is interacts with the processor.

The present invention transmits cells from channels having different cell rates (e.g., cells per time slot) different priorities (e.g., high, medium, low) and different protocols (such as AAL2) to the network, without interference between the channels, without losing any information and without hampering the quality of service due to the multiplexing and packing scheme of the AAL2 layer.

For convenience of explanation, mathematical symbols used in the following are introduced. Index variables or "pointers" V, V', V'', U(s), and R are conveniently positive integer numbers of the set {M } which is, for example defined as: {M}={1, 2, 3, ... M}. For A, B being positive integers and C∈{M}, a modulo addition mod (A+B)=C is defined as C=(A+B) for A+B≦(M−1) and C=(A+B)−M for A+B>(M−1). A modulo subtraction is defined as C=(A−B) for A−B≧0 and C=(A−B)+M for A−B <0. For convenience, the number M of elements in set {M}, also called "base", can be indicated as subscript, such as in e.g., $\mod_M(A+B)$.

The symbol ":=" (colon with equal sign), which is commonly used in the programming art, illustrates that a variable (e.g., X) standing left of ":=" is assigned the value expressed to the right of ":=". The variable on the left can appear also on the right side.

Figure 6:
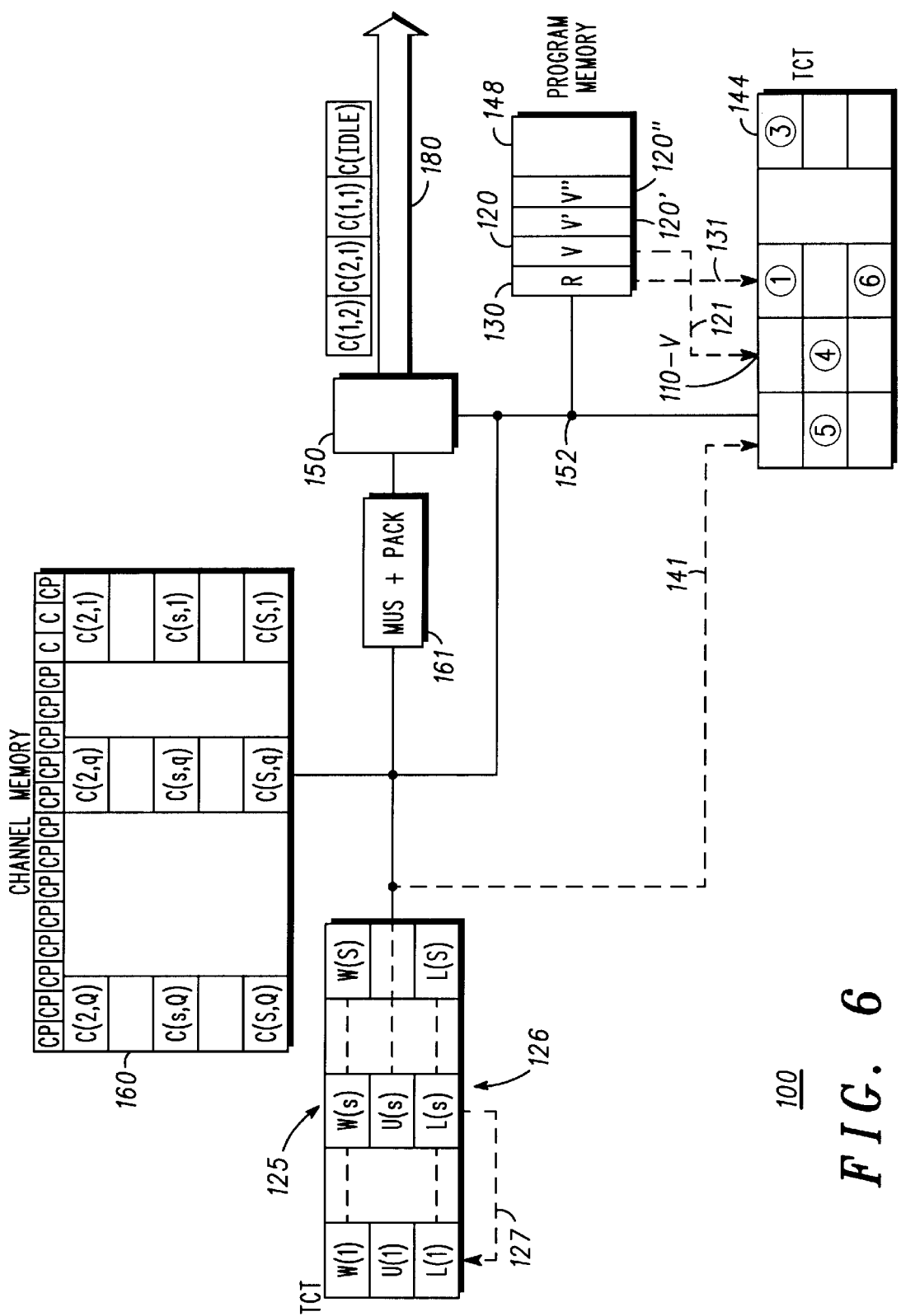
FIG. 6 is a simplified block diagram of a communication system according to a preferred embodiment of the present invention.

FIG. 6 is a simplified block diagram of communication system 100 according to a preferred embodiment of the present invention. System 100 comprises processor 150, channel memory 160, multiplexing and packing unit (i.e.— MPU) 161, communication line 180, transmit connection table 146 (hereinafter TCT), transmit scheduler table 144 (hereinafter TST), and program memory 148. Bus 152 permits the transfer of variables (e.g., V), data cells C(s,r) and instruction commands between processor 150, channel memory 160, program memory 148, TST and TCT. At terminal 151, communication line 180 is coupled to an ATM network (not shown). Communication line 180, terminal 151 and ATM network can be implemented by point to point ATM layer connection 22.

Channel memory 160 has a plurality of S channels 161 identified by CH(s) with single index s=1 to S. Each non-AAL2 channel CH(s) has Q data cells 102 identified by C(s,q) with index pair (s,q)(s=1 to S, q=1 to Q). It is assumed that every non-AAL2 channel CH(s) has an equal number Q of data cells. Several streams of CPS packets are merged onto a single ATM AAL2 channel. Conveniently, the data streams can be stored in channel memory 160. An ATM ALL2 channel CH(s) has B CPS-packets identified by CPS(s,b) with index pair (s,b)(s=1 to S, b=1 to B). For example, in FIG. 3 B=14, in FIG. 4 B=8 and in FIG. 5 B=4. Conveniently, the CPS packets are packed by MPU 161. These assumptions are convenient for explanation, but not necessary for the invention. A person of skill in the art is able to provide data cells 102 into channel memory 160 by means (e.g. data and address busses, load commands) well known in the art. Idles cells 105, (also "C(idle)") are generated, preferably, in processor 150 and sent to communication line 180. At any time, channel CH(s) can be able to send cells or can be silent.

According to a series of steps stored in program memory 148, processor 150 accesses information stored in TST and TCT and advances data cells C(s,r) into communication line 180 according to a method of the present invention. As for example in FIG. 6, cells C(1,1), C(2,1), C(1,2) have already been moved from channel memory 160 (cells in italics) to communication line 180 (cells typed bold).

TST is a cyclic table having V=1 to M schedule fields 110-V, and optionally, further V'=1 to M schedule fields 110'-V', V"=1 to M schedule fields 110'-V" and so on. Each schedule field 110-V, 110'-V', and 110-V" can store one or more channel identifiers "s" ("token") or can be empty. In the following text and in FIGS. 6–7, channel identifiers "s" are written by encircled integer numbers s, for example: ①, ②, ③, ④, ⑤, and ⑥.

Preferably, TST is organized as a time-slot table, wherein one field such as field 110-V corresponds to one time slot.

TCT has, preferably, s=1 to S parameter fields 125 (also 125-s) containing traffic parameters W(s) for each channel CH(s)(s=1 to S) such as, for example:

(i) the kind of service of CH(s), such as, for example, a Constant Bit Rate (CBR), a Variable Bit Rate (VBR), and an Unspecified Bit Rate (UBR);

(ii) a period P(s);

(iii) for VBR-channels: a Sustain Cell Rate (SCR) or the sustain period $P_s(s)$ (also referred to as P(s)) as an equivalent, a Peak Cell Rate (PCR) or the burst period $P_B(s)$ as an equivalent, a sustain pointer U(s) and a burst tolerance BT(s);

(iv) for AAL2 channels: a Timer_CU period of the channel (i.e.—TCU(s)) and a plurality of variables associated with TCU(s), with a transmission of a cell and of the rescheduling of a transmission of a next cell. These variable can include a plurality of variables such as but not limited to a variable MUST(s) that indicates if TCU(s) expires, another variable Tempt(s) that indicates if TCU(s) is measured, and a Prior(s) variable indicating whether TCU(s) expired during a preceding transmission. Prior(s) is used to reschedule a transmission of a cell after a preceding data cell was transmitted as a result of a TCU(s) expiration.

An AAL2 channel can be either CBR or VBR, and accordingly has the parameters mentioned above.

(v) priority information (e.g., "high" for voice phone channels, "medium" for traffic supervision channels, "low" for e-mail channels). Preferably, an AAL2 channel has a high priority.

"s" can indicate a channels type. But the type of the channel can also be stored in another variable CH_TYPE(s) that is stored in TCT. For example, "s" or CH_TYPE(s) can indicate whether the channel is a VBR/CBR and/or an AAL2 channel.

TCT also has, preferably, s=1 to S link fields 126 (also 126-s) having entries identified by L(s)(s=1 to S). L(s) for channel CH(s) comprises the channel identifier "s" of another channel CH(s). The underscoring of the letter "s" is used for distinction. For example, dashed line 127 from link field 126-s (with L(s)=①) points to link field 126-1 W(1) and L(1) of channel CH(1). Program memory 148 stores variables V(120), V'(120'), V" and R(130), as well as stores instruction commands for processor 150 and other entries explained in connection with FIG. 5. Variable V, also called "virtual pointer" shows to field 110-V of TST as indicated by dashed line 121 (e.g., to field 110-2. Variable R ("real pointer") is, preferably, larger or equal V(R≧V) and shows to field 110-R (dashed line 131 to e.g., field 110-4). An optional variable U(s) in TCT, called sustain pointer of channel CH(s) shows to field 110-U(s), 110'-U(s), or to 110"-U(s) (dashed line 141 to e.g., field 110-2)).

In the explanation of method 500 of the present invention, the unit (slot/cell) of P(s) and $P_B(s)$ is left out for simplicity. P(s) and $P_B(s)$ are compared to pointers (e.g., V and R).

Data transmission capacity can be expressed in various ways. Communication line 180 itself has a bit rate F of e.g., F=155 Megabit per second. In every time slot TS(R), communication line 180 transmits a predetermined number $N_{slot}$ of cells C(s,q) or C(idle), giving a cell rate $N_{slot}/TS(m)$ (cell per time slot). In example (A), $N_{slot}$ equals $N_{slot}$=2.

Preferably, communication system 100 is able to transmit cells C(s,q) from e.g., S=20 channels and TST has e.g., M=1024 fields 110-V. During one timeslot TS(R), e.g., $N_{slot}$=8 cells are transmitted. For example, a CBR-channel CH(s) having a period of P(s)=256, sends data cells to communication line 180 with a resulting bit rate of e.g., around 0.6 Megabit per second (F/P, e.g., 155/256≅0.6 Megabit per second). Or, an UBR-channel CH(s) with P(s)=16 sends with a higher bit rate of e.g., around 9.7 Megabit per second.

Figure 7A:
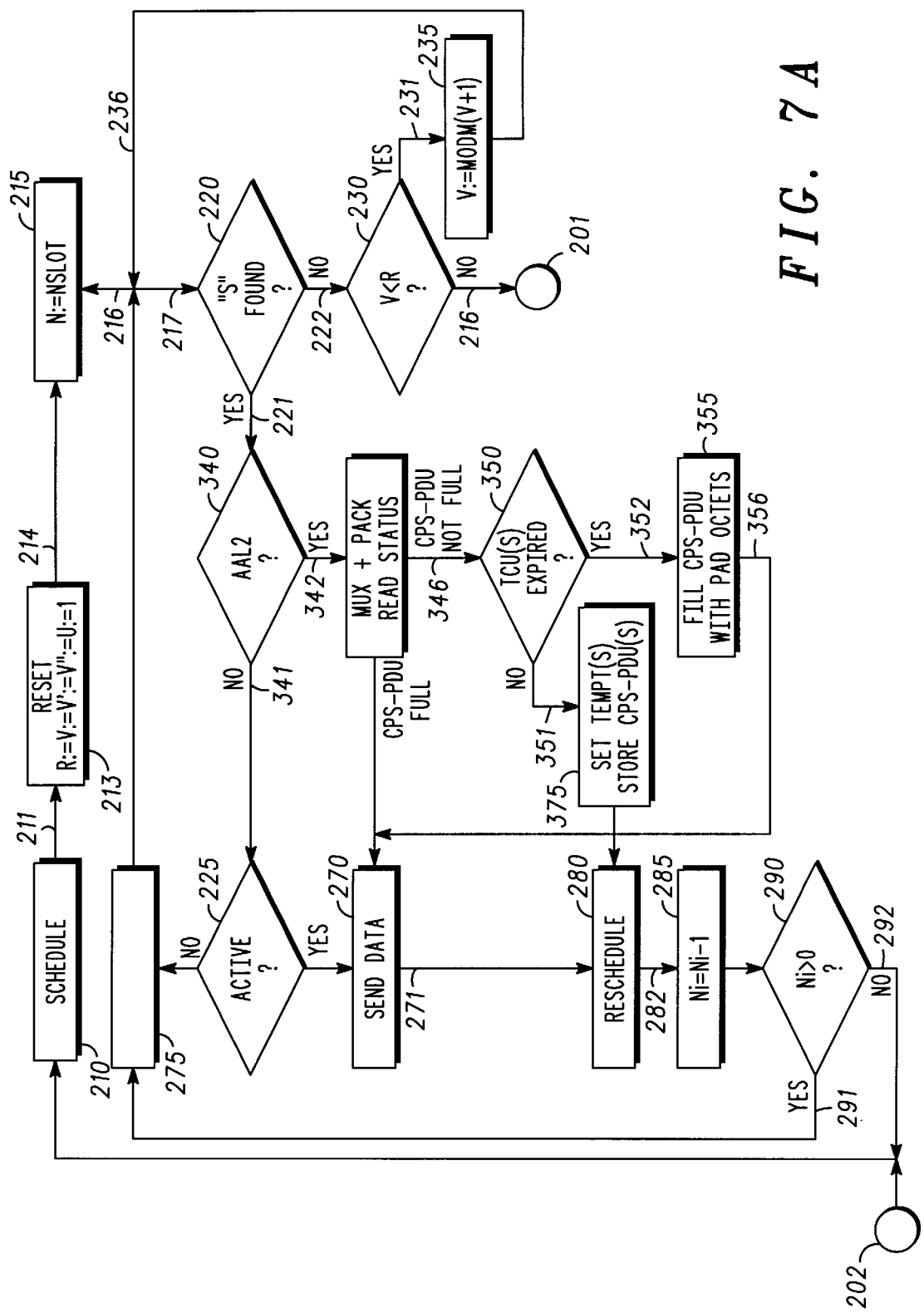
FIGS. 7A–7B is a simplified flow chart diagram illustrating a method of the present invention for the communication system of FIG. 1.
Figure 7B:
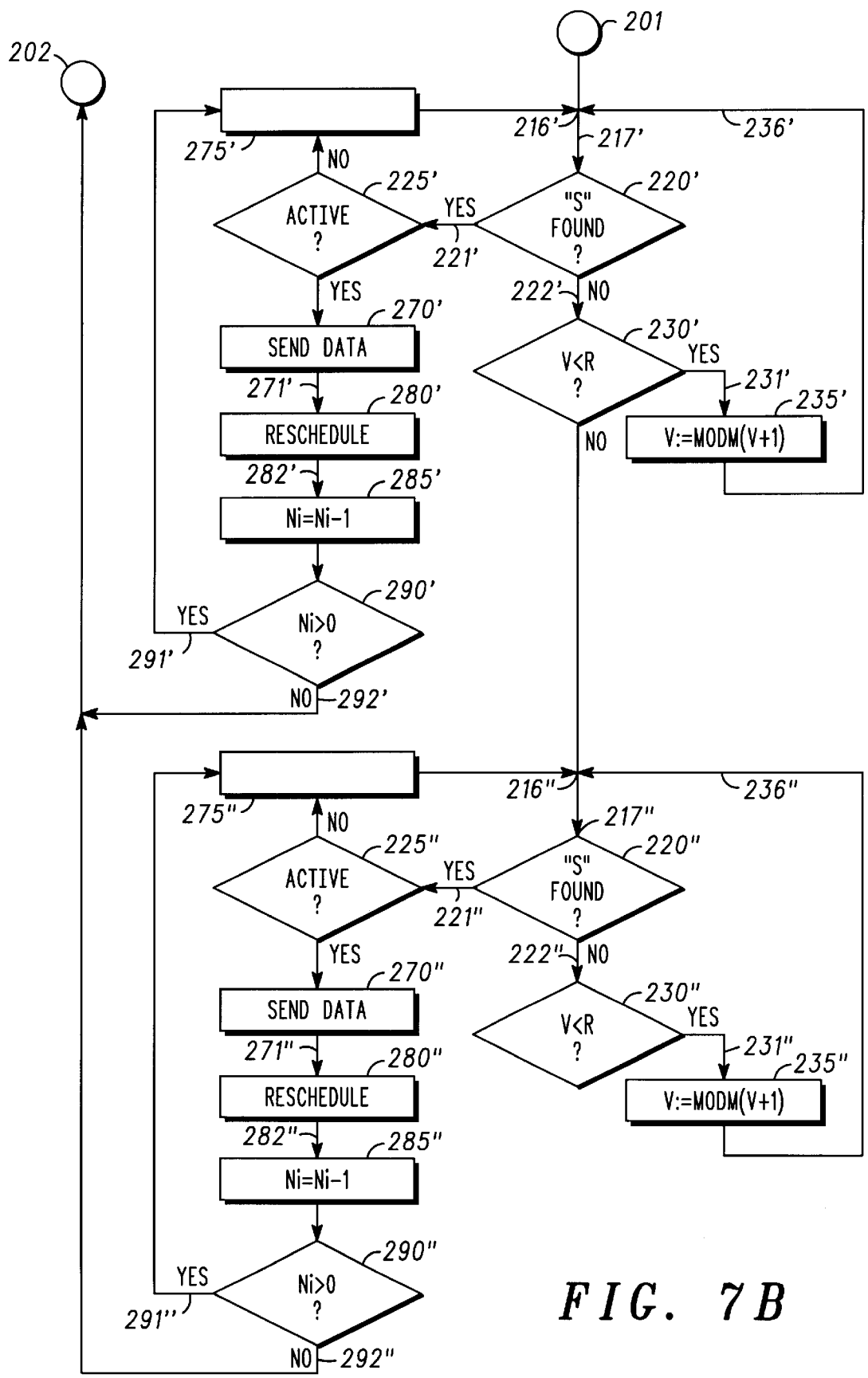

FIGS. 7A–7B is a simplified flow chart diagram illustrating method 200 of the present invention for operating communication system 100 of FIG. 6. FIG. 7B is a continuation of FIG. 7A coupled by place holders 201 and 202. Preferably, method 200 comprises steps 210, 213, 215, 220, 225, 230, 235, 250, 270, 275, 276, 280, 285, 286, 290, 295, 340, 345, 350, 355 and 375 illustrated by blocks. Solid lines 211, 214, 216, 217, 221, 222, 231, 232, 236, 271, 277, 282, 287, 291, 292, 293, 294, 341, 342, 346, 351, 352, 356 and 376 coupling the steps indicate a preferred method flow. Steps with reference numbers having no prime markers (e.g., step 220) are executed with the highest priority.

Optionally, processor 150 executes steps 220, 340, 225, 230, 270, 275, 280, 285, and 290 two or more times for different priorities. In the example of FIGS. 7A–B, these steps have reference numbers with prime markers (e.g., step 220') for medium priority or double-prime markers (e.g., step 220") for low priority. Persons of skill in the art are able, based on the description herein, to apply method 200 to applications with more or with less priorities. Preferably, AAL2 channels have high priority and they are not handled by equivalent steps 345', 350', 355' and 375' for medium priority and 345", 350",355" and 375" for low priority.

For convenience, the blocks for step 270, 270', 270", and 276 in which processor 150 transmits ATM cells are illustrated bolder than the blocks of the other steps. Conveniently, steps and lines of FIG. 7 represent instruction commands for processor 150 which are, preferably, stored in program memory 148. Query steps 220, 225, 230, 290, 295, 340 and 350 represent steps with conditional deviations ("yes" or "no") of the step sequence.

For convenience of explanation, the steps without prime-markers are explained first. It is assumed, that all channels have High priority. The priority mechanism in connection with the primed steps is explained later. Primed and double-primed steps are not executed. Line 232 goes directly to step 276. Details for these "unprimed" steps are as follows:

In step 210, labeled "SCHEDULE", processor 150 writes channel identifiers "s" into schedule fields 110-V. Conveniently, the number of identifiers is equal to S. Preferably, processor 150 writes identifiers into fields 110-V according to the periods P(s) of the channels (V=P(s)). Every schedule field 110-V can receive a single, two or more channel identifiers or can stay empty. Line 211 leads to step 213.

In step 213, labeled "RESET", pointer R is initially assigned to a single schedule field 110-R. Preferably, pointer R=1 is initially assigned to field 110-1 and pointer V=1 is assigned field 110-1. Steps 210 and 213 can be performed in either order. Line 214 leads to step 215.

In step 215 an auxiliary counter variable N is assigned to $N_{slot}$ (see section (e)). N indicates how many cells can still be transmitted in a current time slot TS(R). In later steps (e.g., 285, 286, 295, 290) N will be decremented by one and compared with zero every time system 100 sends out a cell. N is used for controlling the method flow. Persons of skill in the art are able, based on the description herein, to control the preferred method flow also by other means. For example, a counter variable can also be incremented and compared to $N_{slot}$. Step 215 is the first steps in a loop of steps 220, 225, 230, 235, 250, 275, 276, 280, 285, 286, 290, 295, 340, 345, 350,355 and 375. In the loop, pointer R remains constant. Lines 216 and its continuation line 217 lead to the next step.

In query step 220 (labeled "s found?"), processor 150 is looking up for channel identifiers "s" in the schedule field 110-V identified by V. If processor 150 finds a single identifier (cf. "yes"-line 221), then processor 150 follows steps 225 and optionally one of the five following paths— step 275; steps 340, 270, 280, 285 and 290; steps 340, 345, 270, 280, 285 and 290; steps 340, 345, 350, 375, 280, 285 and 290 ;and steps 340, 345, 350, 355, 270, 280, 285 and 290. If processor 150 finds two or more identifiers then processor 150 executes step 225 and then follows one of these paths until there are no more identifiers of the high priority in a time slot.

But assuming first, that schedule field 110-V is empty so that processor 150 does not find an identifier (cf. "no"-line 222).

In query step 230 ("V<R?"), processor compares pointer V with pointer R. If pointers V and R are different ("yes"-line 231), then pointer V is modified in step 235 and step 220 is repeated (line 236 from step 235 to step 220). In step 230, processor 150, preferably, investigates whether V has reached R or not, (e.g.: V<R?). If yes, pointer V is modulo incremented by one (step 235):$V:=mod_M(V+1)$. If not (e.g., V=R), processor 150 sends idle cells C(idle). This is explained later.

Assume now, that in step 220, processor 150 has identified one channel identifier "s" ("yes"-line 221). In step 340 processor 150 checks whether the channel is an AAL2 channel or not.

As indicated by path 341, if the answer is "no" step 340 is followed by step 225. Preferably, the check is based upon the value of CH_TYPE(s) being fetched by processor 150 from TCT during step 340. In step 225, processor 150 tests if the (non AAL2) identified channel CH(s) is active. A non AAL2 active channel CH(s) is able to provide a data cell C(s,r). In step 270, ("SEND DATA"), processor 150 transmits a single data cell C(s,r) from channel CH(s) to communication line 180. In step 280, ("RESCHEDULE") processor 150 moves the channel identifier from field 110-V to a different field 110-J. The different field 110-J is identified by jump index J. Preferably, the channel identifier "s" is thereby deleted from field 110-V. Details for step 280 are explained in connection with FIGS. 9–12.

In step 285, processor 150 decrements counter N by 1:N:=N−1. In query step 290, processor 150 compares N to $N_{slot}$. N is either larger than zero (N>0, line 291) or zero (N=0, line 292). Line 291 going back to step 220 indicates that processor 150 looks up for a next identifier in the same field 110-V. Processor 150 now performs one of the five mentioned above paths. If the capacity of communication line 180 to carry cells in timeslot TS(R) is exhausted (N=0, line 292), then processor 150 finishes the loop and goes to the next time slot (step 250). It can happen, that in the actual time slot TS(R), a channel CH(s) is passive (not active) although data transmission has been scheduled ("no"at query step 225). In such cases, processor 150 performs step 275 in which channel identifier "s" is moved to a different location within TST. Step 275 is similar to step 280, so that a person of skill in the art does not need further explanation.

Assume now that in step 340 the answer is "yes". Step 340 is followed by step 345. Conveniently CPS-packets stored in memory channel 160 are both multiplexed and packed during step 345. CPS-packets can also be written to channel memory after previously being multiplexed. Conveniently, a multiplexing and packing unit 161 is coupled to channel memory and to processor 150 via bus 152 in a manner that allows multiplexing and packing unit 161 to access channel memory 160 to read and multiplex CPS-packets from various CPS channels and to pack them into CPS-PDU(s). Processor 150 receives status signals from multiplexing and packing unit such as signals indicating whether a CPS_PDU(s) is full and provides the multiplexing and packing unit control signals such as signals for selecting the channel(s) and timing signals for initiating and ending the multiplexing and packing operation. As mentioned above, CPS-packets can be stored in a multiplexed manner within channel memory 160. In such a case multiplexing and packing unit only performs packing operations. If multiplexing and packing unit 161 previously started to fill PCS-PDU(s) but did not manage to fill it and transmit it during a previous 234–355 steps, multiplexing and packing unit 161 fetches CPS_PDU(s) from channel memory 160 and continues to multiplex and pack data into CPS_PDU(s). In order to save memory locations within channel memory 160, a variable within TCT indicates if there is a need store and accordingly fetch CPS-PDU(s). Multiplexing and packing unit 161 can also fetch CPS_PDU(s) each time it starts to handle channel CH(s). Either multiplexing and packing unit 161 or processor 150 convert CPS-PDU(s) to an ATM cell ATM(s), ATM(s) is transmitted by processor 150 during step 270. During step 345 processor 150 also performs three tests: it checks (i) whether CPS-PDU(s) can be filled during the current timeslot, (ii) if it must transmit CPS-PDU(s) during the current timeslot—if TCU(s) expires during the current time slot, and (iii) if there is a need to start measuring TCU(s). Preferably, the second test is based upon MUST(s) that is fetched by processor 150 from TCT. These three tests are explained in further details later. MUST(s) is set when TCU(s) expires. MUST(s) is reset after CPS_PDU(s) is send. MUST(S) can be reset during step 355. Conveniently, a full CPS-PDU(s) can be provided if there are enough CPS-Packets in channel memory 160.

If a full CPS_PDU(s) can be provided and transmitted during the current timeslot, then step 345 is followed by step 270. If a CPS-packet is split between some CPS-PDUs processor 150 sets Tempt(s) that indicates that there is a need to start measuring TCU(s).

If a full CPS_PDU(s) can not be provided to processor 150 be transmitted during the current timeslot, then step 345 is followed by query step 350 in which processor 150 checks whether it must transmit CPS_PDU(s) during the current timeslot—if TCU(s) expires during the current time slot. Conveniently, processor 150 checks if MUST(s) is set. If the answer is "yes" step 350 is followed by step 355 in which CPS_PDU(s) is filled with PAD octets. Step 355 if followed by step 270 so that during the current time slot a cell is transferred. If the answer is "no" step 350 is followed by step 375. During step 375 CPS_PDU(s) is stored in channel memory 160 to be retrieved during the next time step 345 is executed in accordance with channel "s" and processor 150 sets a temporary variable that indicates that there is a need to start measuring TCU(s). Step 375 is followed by step 280, as indicated by path 376.

Assume now, that in step 220 processor 150 has not found an identifier and that pointer V has already reached pointer R (step 230, 232). Illustrated by a dashed frame 240 with steps 276, 286, 295 and lines 277, 294 and 293, processor 150 sends N idles cells C(idle) to communication line 180. For example, processor 150 sends a single idle cell C(idle) in step 276 ("SEND IDLE"), decrements N in step 286 ("N:=N−1"), compares N to zero in step 295, repeats steps 276, 286 and 295 as long as N>0 (line 293) and goes to step 250 (via line 294).

When counter N has reached zero (cf. compare steps 290 and 295), then processor finished the loop. In step 250, pointer R goes to the next time slot, preferably, by incrementation: R:=mod$_M$(R+1).

Processor 150 has now reached step 215 again. Note, that at the end of the loop, pointer V is not automatically incremented. Unless incremented by step 235, pointer V stays unchanged. In other words, pointer V is conditionally advanced to pointer R when (i) field 110-V is empty (cf. step 220, "no"-line 222) and (ii) V lags behind R (cf. step 230, "no"-line 230). The sending of idle cells (which is not scheduled) can be considered as a remedy if all attempts to identify channels (cf. step 220) have repeatedly failed.

Now, the priority mechanism is explained in connection with the primed and double-primed steps. Line 232 is continued by line 216'; and step 276 follows step 230" on line 232". In step 210 ("SCHEDULE"), processor 150 writes channel identifiers for high priority channels into schedule fields 110-V, channel identifiers for medium priority channels into schedule fields 110'-V', and channel identifiers for medium priority channels into schedule fields 110'-V". In step 213 ("RESET"), pointer R is initially assigned to a single schedule field 110-V. Preferably, the pointers are initially assigned as: pointer R to field 110-1 (R=1), pointer V to field 110-1 (V=1, high priority), pointer V' to field 110'-1 (V'=1, medium priority) and pointer V" to field 110"-1 (V"=1, low priority). In step 215 counter variable N is assigned to $N_{slot}$.

Assuming that at the beginning of time slot TS(R), processor 150 has executed steps 220 and 230 (high priority) and is at "no"-line 232 of query step 230. There can be various reasons for this state. For example, system has sent out less than $N_{slot}$ cells (step 270), or processor 150 did not find channel identifiers in high priority fields 110-V (see step 220, line 222, steps 230, 235).

Communication line 180 still can carry N data cells during the present time slot TS(R). Now, processor 150 searches for channel identifiers "s" in medium priority fields 110'-V'. Processor 150 performs primed steps 220', 230', 235', 225', 275', 270', 280', 285', 290' similarly to the corresponding unprimed steps. At the end of this medium priority loop, system 100 has either used the capacity of communication line 180 completely (see steps 285, 290, N=0) or is still able to transmit further cells (e.g., N≈0, "no"-line 232' at step 230').

Unless system 100 goes to the next time slot (step 250 for N=0), system 100 investigates low priority fields 110"-V". Double-primed steps 220'", 230", 235", 225", 275T", 270", 280", 285", 290" are executed corresponding to the unprimed and primed steps. If processor 150 does not find further channel identifiers steps 220" and virtual pointer V" has reached R (query step 230" at "no"-line 232"), then processor 150 sends idle cells C(idle) (e.g., steps 276, 286, 295).

This is an advantage of the present invention. In other words, according to method 200 of the present invention, processor 150 looks up in schedule fields (e.g., 110-V, 110'-V, 110"-V") until processor 150 does not find any more channel identifiers. The fields in which processor 150 looks up are determined by time slot pointer R and by virtual pointers V, V" and V'". Also, the number of schedule fields which are accessed by processor 150 is decreased when pointers V, V' and V" move closer to pointer R. This features allows an optimal capacity utilization of communication line 180.

Figure 8:
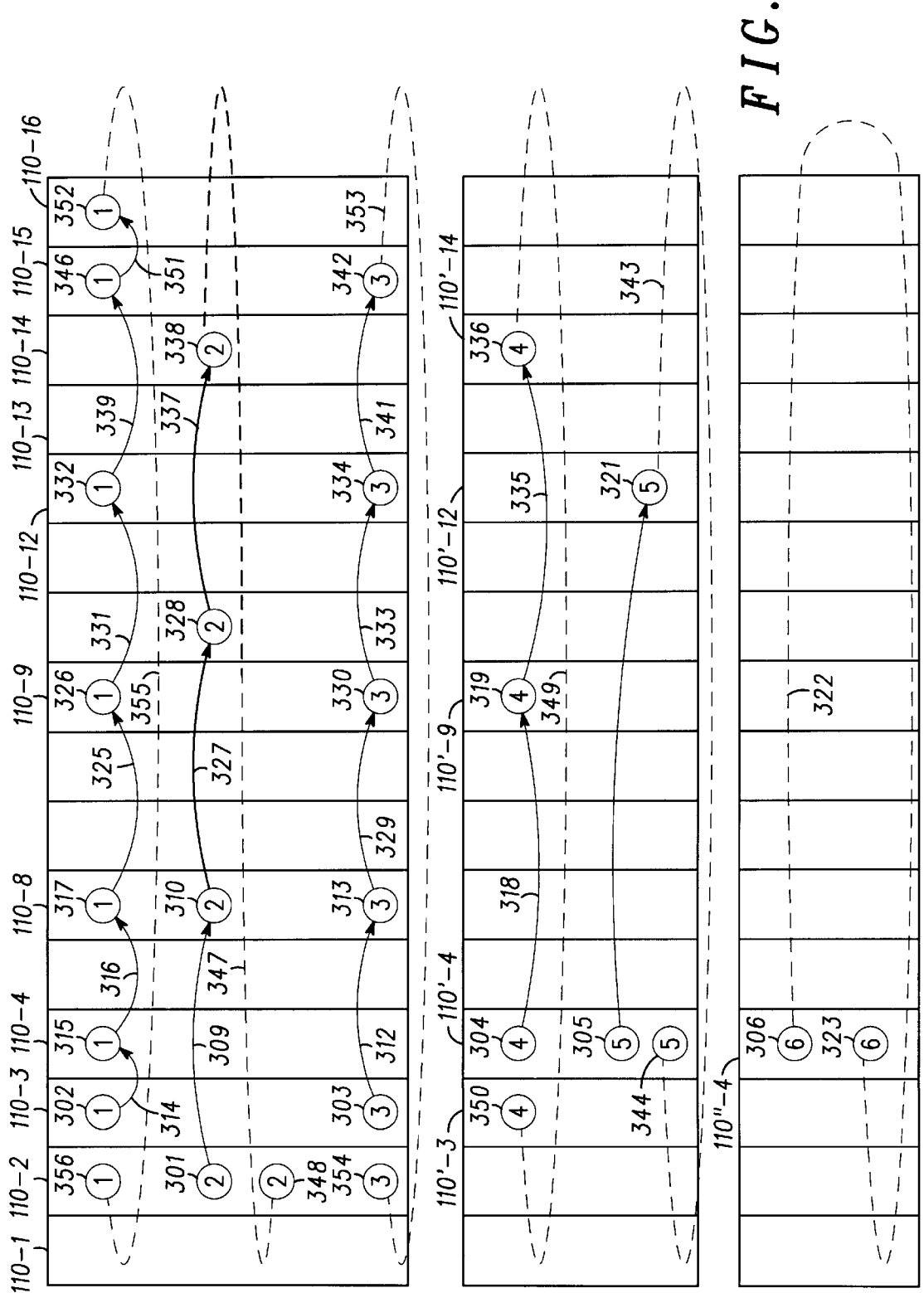
FIG. 8 illustrates schedule fields of a table in the system of FIG. 1 for a first example.

FIG. 8 illustrates schedule fields 110-V, 110'-V', and 110"-V" of TST for V, V', V"=1 to M=16 of example (A). Channel "s" identifiers are, e.g., ①, ②, and ③ in high priority fields 110-V, ④ and ⑤ in medium priority fields 110'-V', and ⑥ in low priority fields 110"-V". Channel ① is an AAL2 channel. Channel identifiers "s" and lines between them are identified by reference numbers 301–328 whose order indicates a preferred sequence in time.

Channel ① is an AAL2 channel, characterized by having a high priority, P(1)=3 (CBR) and TCU(1)=1. Channel ②–⑥ are CBR channels. Channel ② and ③ have high priority, channels ④ and ⑤ have medium priority and channel ⑥ has low priority. Channels ②③④⑤ and ⑥ have period of 4,3,5,8 and 16 accordingly.

Channels identifiers ① ② ③ ④ ⑤ and ① (bold circles) having numbers 301–306 illustrate how processor 150 schedules channels CH(1) to CH(6) in scheduling step 210 (FIG. 5); and channel identifiers ① ② ③ ④ ⑤ and ⑥ with numbers 308, 310, 313, 315, 317, 319, 326, 328, 330, 332, 334, 336, 338, 340, 342, 346, 348, 350, 352 and 354 illustrate how processor 150 re-schedules channels in steps 280, 280', and 280" (FIG. 5).

Initially in step 210, processor 150 writes: (i) ①② and ③ to high priority fields 110-V according to the periods of CH(1) to CH(3), i.e. ① (301) and ② (302) to field 110-2 (period P(2)=2 and P(3)=2) and ③ (303) to field 110-3 (period P(3)=3); (ii) ④ and ⑤ to medium priority fields 110'-V' according to the periods of CH(4) and CH(5), i.e. ④ (304) and ⑤ (305) to field 110'-4 (P(4)=4 and P(5)=4); and (iii) ⑥ to high priority fields 100'-m' according to the period of CH(6), i.e. ⑥ (306) to field 110"-4.

In re-scheduling steps 280, 280' and 280" processor 150 moves channel identifiers ① ② ③ ④ ⑤ and ⑥ to fields identified by jump index J. Processor 150 moves the channel identifiers within fields 110-V, 110'-V' and 110"-V" as follows:

During time slot TS(2), ② (302) from field 110-2 to field 110-6 (line 309). During time slot TS(3), ① (308) from field 110-3 to field 110-4 (line 314) and ③ (303) from field 110-3 to field 110-6 (line 312). During time slot TS(4), ① (315) from field 110-4 to field 110-6 (line 316), ④ (304) from field 110-4' to field 110-9' (line 318), ⑤ (305) from field 110'-4 to field 110'-12 (line 320) and ⑥ from field 110"-4 to field 110"-4 (323)(dashed line 322). During time slot TS(6), ① (317) from field 110-6 to field 110-9 (line 325), ② (310) from field 110-6 to field 110-10 (line 327) and (313) from field 110-6 to field 110-9 (line 329). During time slot TS(9) ① (326) from field 110-9 to field 110-12 (line 331), ③ (330) from field 110-9 to field 110-12 (line 333) and ④ (319) from field 110-9' to field 110-14' (line 335). During time slot TS(10) ② (328) from field 110-10 to field 110-14 (line 337). During time slot TS(12) ① (332) from field 110-12 to field 110-13 (line 339), ③ (324) from field 110-12 to field 110-15 (line 341), and ⑤ (321) from field 110'-12 to field 110'-4 (344) (dashed line 343). During time slot TS(13) ① (340) from field 110-13 to field 110-15 (line 345). During time slot TS(14) ② (338) from field 110-14 to field 110-2 (348) (dashed line 347) and ④ (336) from field 110'-14 to field 110'-3 (350) (dashed line 349). During time slot TS(15), ①(346) from field 110-15 to field 110-16 (line 351) and ③(342) from field 110-15 to field 110-2 (354)(dashed line 353). During time slot TS(16), ①(352) from field 110-16 to field 110-1 (356)(dashed line 355).

Channel ① is an AAL2 and it is assumed, for convenience of explanation only, that it performs the multiplexing and packing scheme illustrated in FIG. 4 in a periodic manner. Thus, at time slot TS(3) processor 150 converts a portion of CPS packet 80 to CPS_PDU 74$ and to an ATM cell, transmits the ATM cell and re-schedules channel identifier ①(line 314) from field 110-3 (301) to field 110-4 (315). At time slot TS(4) processor 150 converts a remaining portion of CPS packet 80, CPS packets 81, 82 and a portion of CPS packet 83 to CPS_PDU 75$ and to an ATM cell, transmits the ATM cell and re-schedules channel identifier ①(line 316) from field 110-4 (315) to field 110-6 (317). At time slot TS(6) processor 150 converts a remaining portion of CPS packet 83 and a portion of CPS packet 84 to CPS_PDU 76$ and to an ATM cell, transmits the ATM cell and re-schedules channel identifier ①(line 325) from field 110-6 (317) to field 110-9 (326). At time slot TS(9) processor 150 converts a remaining portion of CPS packet 83 and a portion of CPS packet 84 to CPS_PDU 77$, and to an ATM cell, transmits the ATM cell and re-schedules channel identifier ①(line 331) from field 110-9 (326) to field 110-12 (332). At time slot TS(12) processor 150 converts CPS packet 85 to CPS_PDU 78$, and to an ATM cell, transmits the ATM cell and reschedules channel identifier ①(line 339) from field 110-12 (332) to field 110-15 (346). At time slot TS(15) processor 150 converts CPS packet 86 and a portion of CPS packet 87 to CPS_PDU 79$ CPS_PDU 79$ is not full. TCU(s) starts to be measured. Because TCU(s)=1 then TS(16) CPS_PDU must be transmitted. Accordingly, processor 150 reschedules channel identifier ①(line 351) from field 110-15 (346) to field 110-16 (352). During time slot TS(16) additional CPS packets of channel ① do not arrive, but it must be transmitted, therefore processor 150 fills the remaining portion of CPS_PDU 79$ with PAD octets, converts it to an ATM cell, transmits the ATM cell. TCU(s)=1 and P(s)=3 so that GAP(s)=2. Thus, processor 150 re-schedules channel identifier ①(line 355) from field 110-16 (352) to field 110-1 (356).

Figure 9:
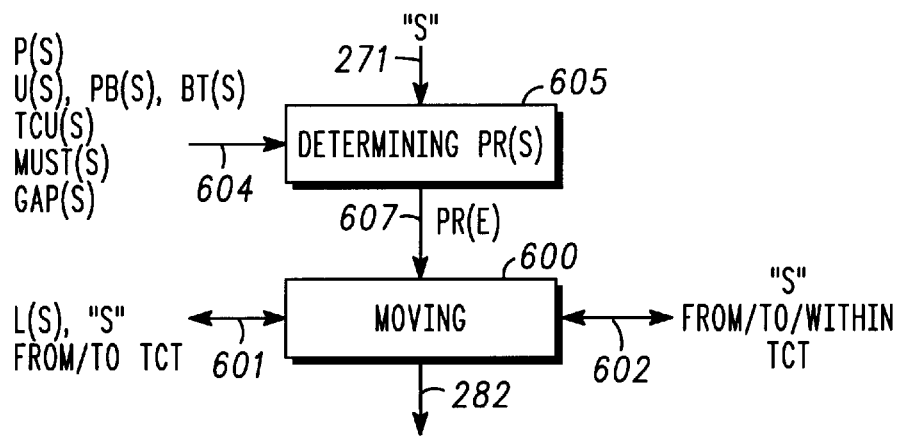
FIG. 9 illustrates a simplified flow chart diagram with more details for a re-scheduling step of the method of FIGS. 7A–B.

FIG. 9 illustrates a simplified flow chart diagram with more details for re-scheduling step 280 of method 200.

Re-scheduling step 280 comprises determining step 605 and moving step 600. Preferably, steps 605 and 600 are performed consecutively. Details for steps 605 and 600 are explained in connection with FIGS. 10–12. Lines 272 and 282 illustrate how FIG. 9 fits into FIGS. 7A–B.

In determining step 605, processor 150 reads at least a portion W(s) and computes a parameter $P_R(s)$ to be used in step 600. If a channel is a non-AAL2 CBR channel, processor reads period P(s). If a channel is a non-AAL2 VBR channel, processor 150 also reads sustain pointer U(s), burst period $P_B(s)$ and burst tolerance BT(s) from TCT. If a channel is an AAL2 CBR channel, processor 150 reads period P(s), TCU(s), MUST(s), a variable Tempt(s) that indicates whether TCU(s) is being measured, and a variable GAP(s) that measures a period between a current time slot and a time slot in which TCU(s) expires. If a channel is an AAL2 VBR channel, processor 150 reads P(s), U(s), $P_B(s)$, BT(s), TCU(s), MUST(s), Tempt(s) and GAP(s) from TCT.

In moving step 600, processor moves channel identifiers "s" within TST and identifiers and link entries L(s) between (from/to) TST and TCT. This is symbolized by double arrows 601 and 602 at step 600.

Preferably, AAL2 channels have high priority, thus steps 280' and 280" are adapted to handle non-AAL2 channels.

Thus, during step 605' and 605" processor 150 reads period P(s) and if the channel is a CVR channel it further reads sustain pointer U(s), burst period $P_B(s)$ and burst tolerance BT(s) from TCT.

Figure 10:
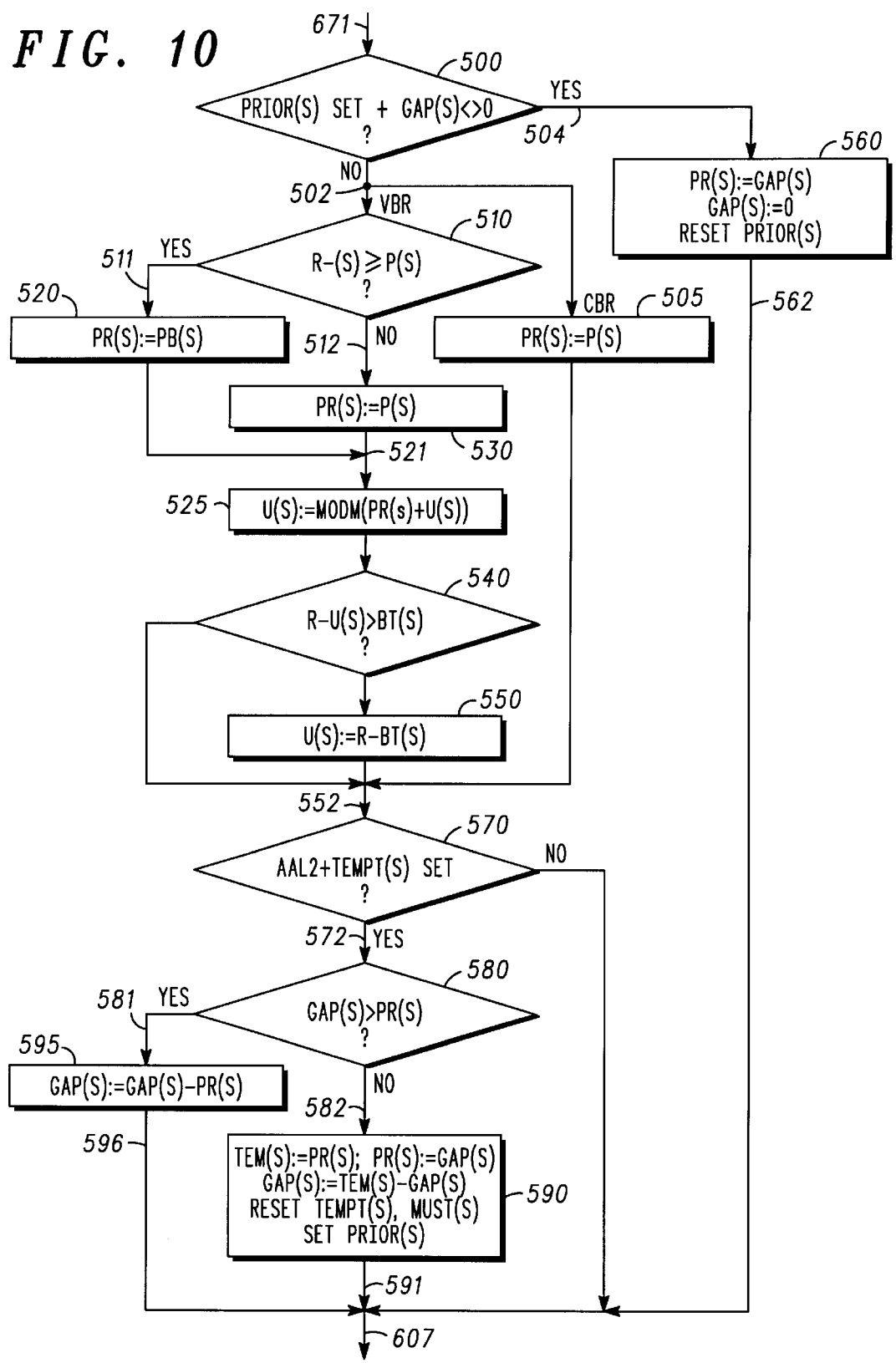
FIG. 10 is a simplified flow chart diagram illustrating a determining step that is part of the re-scheduling step of FIG. 9.

FIG. 10 is a simplified flow chart diagram illustrating determining step 605 which is part of re-scheduling step 280. Lines 271 and 607 illustrate how FIG. 10 fits into FIG. 9.

Preferably, determining step 605 comprises steps 500, 505, 510, 520, 530, 525, 540, 550, 560, 570, 580, 590 and 595 illustrated by blocks. Solid lines 502, 504, 511, 512, 521, 541, 542, 552, 562, 572, 581, 582, 591 and 596 coupling the steps indicate a preferred method flow.

During determining step 605, processor 150 can perform a path out of the following paths:

A first path, comprising steps 500, 505 and 570, handles a non-AAL2 CBR channel. Such a channel is characterized by period P(s). In such a case $P_R(S):=P(s)$.

A second path, comprising steps 500, 510, one of steps 520 and 530, steps 525, 540, optionally step 550, and step 570. Second path handles non-AAL2 VBR channels. In such a case $P_R(S)$ is determined according to P(s), U(s), $P_B(s)$ and BT(s).

A third path handles AAL2 channels, either VBR or CBR, whereas a variable Prior(s) is set and GAP(s)<>0. This path comprising steps 500 and 560. Generally speaking, $P_R(S)=$ GAP(s).

A fourth path handles CBR AAL2 channels whereas Prior(s) is not set or GAP=0. This path comprising steps 500, 505, 570, optional step 580 and one of optional steps 590 and 595. Generally speaking, $P_R(S)$ is determined according to P(s), GAP(s) and TCU(s).

A fifth path handles VBR AAL2 channels whereas Prior(s) is not set or GAP=0. This path comprising steps 500, 510, one of steps 520 and 530, steps 525, 540, optional step 550, step 570, optional step 580 and one of optional steps 590 and 595. Generally speaking, $P_R(S)$ is determined according to P(s), GAP(s), TCU(s), U(s), $P_B(s)$ and BT(s).

A person of skill in the art is able to select the appropriate paths by, for example, query steps which are not given for simplicity.

Prior(s) indicates whether during a previous iteration the rescheduling of channel identifier resulted from an expiration of TCU(s). Prior(s) is set in step 590 and reset in step 562. Prior(s) helps to preserve an AAL2 channel bit rate so that even if frequent Timer_CU events occur, the AAL2 channel will not overload the ATM network. Prior(s) is usually used when TCU(s) is greater than P(s) of an AAL2 CBR channel or than $P_s(s)$ of an AAL2 VBR channel.

Another way to prevent an AAL2 channel from overloading the ATM network is by ignoring TCU(s) when a CPS-packet is split between CPS-PDUs. TCU(s) will be taken to account only when TCU(s) expired and CPS-PDU(s) is not full. It can be implemented by adding a variable Empty(s) that is set if CPS-PDU(s) can not be filled during a current time slot and be checked during step 570, if Empty(s) is reset, step 570 is followed by step 285. Yet another way to prevent an AAL2 channel from overloading the ATM network is to allow a "burst" of two CPS-PDU(s) and to reschedule a further transmission of CPS-PDU(s) after a relativly long period such as 2*P(s)–GAP(s). Yet another method to prevent an AAL2 channel from overloading the ATM network to allow the ATM controller to restrict the transmission of cells from an AAL2 channel.

During step 500 processor 150 checks if a channel is AAL2 and Prior(s) is set and GAP(s)<> if the answer is "yes" step 500 is followed by step 560 of the fourth path.

During step 560 processor 150 performs $P_R(s):=GAP(s)$ and afterwards resets GAP(s) and Prior(s) Prior(s):=0, GAP(s):=0. Therefore, the transmission of the following cells of channel CH(s) is scheduled with GAP(s) assuring that a CPS packet associated with CH(s) with one or more octets already packed wait at most the duration of TCU(s) before being transmitted. Step 560 is followed by step 600, as indicated by line 607.

If the answer to the query presented in query step 500 is "no" and the channel is a CBR channel, either an AAL2 channel or not, processor 150 performs step 505 in which it sets $P_R(S)$ to $P(s):P_R(S):=P(s)$. Step 505 is followed by query step 570 in which processor 150 checks if a channel is an AAL2 channel and if TCU(s) is being measured. If the answer is "yes" (a channel is a AAL2 channel and TCU(s) is being measured) step 570 is followed by step 580.

During step 580 processor compares GAP(s) to $P_R(s)$ and if $GAP(s)>P_R(S)$ then step 580 is followed by step 595 in which GAP(s) is updated: $GAP(s):=GAP(s)-P_R(S)$. When GAP(s) is greater or equal than the $P_R(S)$ provided by step 505 then there is no need for the Timer_CU to initiate a transmission of the next cell of CH(s). This transmission is scheduled according to period P(s). Step 595 is followed by step 600.

If $GAP(s)<P_R(S)$ then step 580 is followed by step 590 wherein $P_R(s)$ and GAP(s) are updated. This update requires to use a temporary variable Tem(s):Tem(s):=$P_R(S)$, $P_R(s):=$GAP(s) and GAP(s):=Tem(s)-GAP(s). Step 590 is followed by step 600. Therefore, the transmission of the following cells of channel CH(s) is scheduled with GAP(s) to become a Timer_CU event.

If the answer to the query presented in query step 500 is "yes" and the channel is a VBR channel, either an AAL2 or not, processor performs comparing step 510, assign steps 520 and 530, advancing step 525, comparing step 540, and adjusting step 550. Preferably, sustain pointer U(s) has been reset earlier to U(s)=1 (for all s=1 to S) in resetting step 213 (FIG. 7).

During comparing step 510 processor 150 calculates the difference between real pointer R and sustained pointer U(s) and compares this difference with period P(s) of the channel CH(s). If $R-U(s) \geq P(s)$ then step 510 is followed by step 520 in which $P_R(S)$ is set to $P_B(s):P_R(S):=P_B(s)$. Therefore, the transmission of the following cells of channel CH(s) is scheduled with burst period $P_B(S)$ to become a burst . If $R-U(s)<P(s)$ then step 510 is followed by step 520 in which $P_R(S)$ is set to $P(s):P_R(S):=P(s)$. Therefore, the next transmission is scheduled according to period P(s). Preferably, period P(s) is larger or equal to burst period $P_B(s)$.

Steps 520 or 530 are followed by advancing step 525 in which U is incremented by $P(s):U(s):=\mod_M(U(s)+P(s))$.

Step 525 is followed by comparing step 540, in which the difference between real pointer R and sustained pointer U is compared with the burst tolerance BT. If $R-U(s)>BT(s)$ then step 540 is followed by step 550. In step 550 U(s) is set to $R-BT(s):U(s)=R-BT(s)$. If $R-U(s) \leq BT(s)$ then step 540 if followed by step 570 and U remains unchanged.

Steps 550 and 540 are followed by step query 570, optional query step 580 and either step 595 or step 590. In query step 570 processor 150 checks if a channel is an AAL2 channel and if TCU(s) is being measured. If the answer is "yes" (a channel is an AAL2 channel and TCU(s) is being measured) step 570 is followed by step 580.

During step 580 processor compares GAP(s) to $P_R(s)$ and if $GAP(s) \geq P_R(S)$ then step 580 is followed by step 595 in which GAP(s) is updated: $GAP(s):=GAP(s)-P_R(S)$. When GAP(s) is greater or equal than the $P_R(S)$ provided by either step 520 or 530 then there is no need for the Timer_CU to initiate a transmission of the next cell of CH(s). This transmission is scheduled according to period P(s)(if $R-U(s)<P(s)$) or according to period $P_B(s)$(if $R-U(s) \geq P(s)$). Step 595 is followed by step 600.

If $GAP(s)<P_R(s)$ then step 580 is followed by step 590 wherein a variable Temp(s) is set to $P_R(s)$, $P_R(s)$ is updated: $P_R(s):=GAP(s)$. After this update GAP(s) is set to Temp(s)−GAP(s). Step 590 is followed by step 600. Therefore, the transmission of the following cells of channel CH(s) is scheduled with GAP(s) to become a Timer_CU event.

Figure 11:
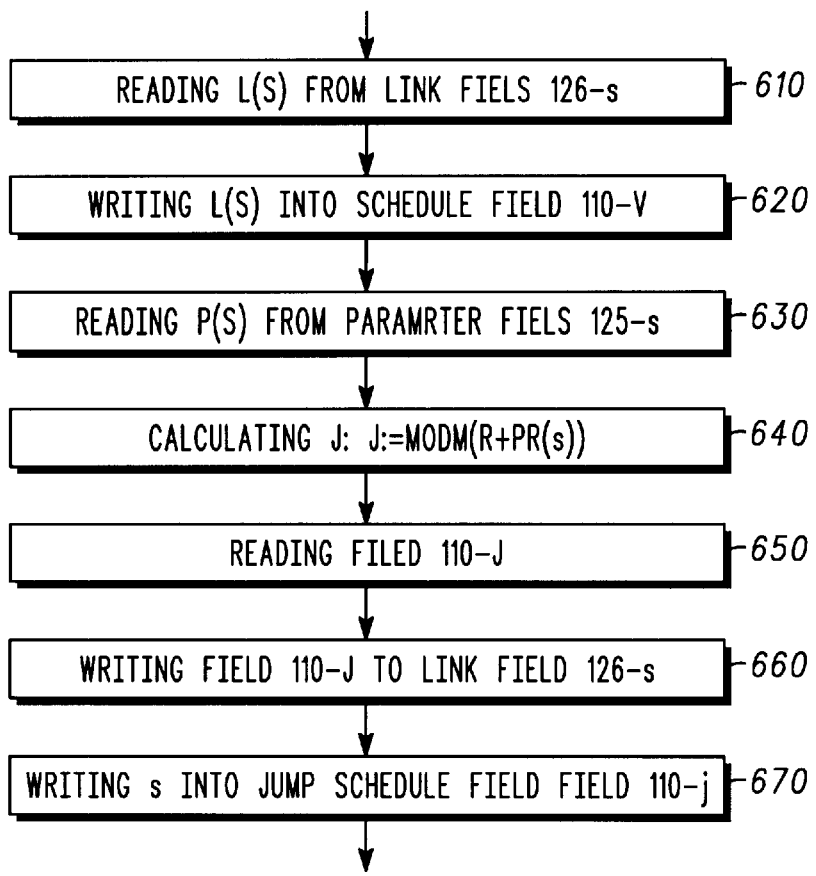
FIG. 11 is a simplified flow-chart diagram of a moving step which is also part of the re-scheduling step of FIG. 9.

FIG. 11 is a simplified flow-chart diagram of moving step 600 which is part of re-scheduling step 280. Steps 605 to 670, are preferably, performed consecutively. Such a sequence is convenient, but not essential for the invention.

Suppose, in step 220, 220' or 220" (FIGS. 7A–B), processor 150 has found a channel identifier "s" in fields 110-V, 110'-V or 110"-V", respectively. In example (A), for V=2 in time slot TS(2), processor 150 has just finished to convert a portion of CPS packet 80 to CPS_PDU 74$ and to an ATM cell and transmit the ATM cell. Channel CH(1) ① is to be re-scheduled to time slot TS(3). GAP(1)=1. The current identifier ① in field 110-2 is no longer needed and will be moved. In other words, processor 150 is at the beginning of arrow 307 (FIG. 8) and moves ① (reference 301) from field 110-2 to field 110-3 ① with reference 307).

In reading step 610, processor 150 reads the entries identified by L(s) from link field 126-s of TCT (FIG. 6). As mentioned above, L(s) contains a channel identifier "s" of another channel CH(s). For example, L(1) contains channel identifier ② of CH(2).

In writing step 620, processor 150 writes the channel identifier "s" from L(s) into schedule field 110-V. For example, ② goes into field 110-2. This is an important aspect, because with the advancing of time, processor 150 will look up in step 220 again. Writing step 630 ensures that TST does not get "out of entries".

In the following steps 630 and 640, processor 150 calculates a time slot TS(J) in which CH(s) is to be scheduled again. In other words, the end of e.g., arrow 307 is under consideration.

In reading step 630, processor 150 reads parameter $P_R(s)$ which has been obtained in step 590. In case identifier "s" identifies a non-VBR and non-AAL2 channel CH(s), then processor 150 can read $P_R(s)=P(s)$ from parameter field 125-s of TCT. In example (A) $P_R(s):=GAP(1):=1$.

In calculating step 640, processor determines a jump index J. J is an index for the new time slot TS(J) in which CH(s) is to be scheduled again. In other words, J identifies jump schedule field 110-J. A new time slot TS(J) should have an index within TST (e.g., $1 \leq J \leq M$). Preferably, J is calculated by $J:=\mod_M(R+P_R(s))$. $J:=\mod_{16}(2+1)=3$.

In reading step 650, processor 150 reads the channel identifiers "s" from jump schedule field 110-J.

In writing step 660, processor 150 writes the channel identifiers "s" from schedule field 110-J as a new entry into link field 126-s. L(s) is now a channel identifier which comes from that field 110-J in TST for a later time slot TS(J).

In writing step 670, processor 150, schedules the next transmission from CH(s) by writing the channel identifier s of CH(s) into jump schedule field 110-J. For example, ① goes into field 110-3, so that channel CH(1) will be connected at the earliest at time slot TS(3).

The present invention can also be described as a multiplexer (e.g., system 100) for forwarding data (e.g., data cells 102) from channels (e.g., CH(s)), whereas at least one channel is an AAL2 channel, to a communication line (e.g., line 180) by time slots (e.g., TS(R)). The multiplexer further implements a "common use" Timer_CU. The multiplexer multiplexes and packs CPS-packets to CPS_PDUs, transforms the CPS_PDUs to ATM cell, whereas the multiplexer assures that CPS-Packets with one or more octets already packed wait at most the duration of a Timer_CU period before being scheduled for transmission.

The multiplexer comprises a first plurality of schedule fields, (e.g., fields 110-V and 110-R) with first fields storing channel identifiers for a current time slot (e.g., field 110-R) and for previous time slots (field 110-V) and second fields storing channel identifiers for future time slots (e.g., field 110-J); and a processor (e.g., processor 150) which during the current time slot (e.g., TS(R) as long as the communication line is able to receive data (e.g., N>0) (i) looks up for a first channel identifier (e.g., "s") in the first fields (e.g., in step 220), (ii) forwards data from that channel which is identified by the first channel identifier (e.g., in step 270), and in a case of an AAL2 channel—multiplexes and packs CPS-packets to form a CPS-PDU that is converted to an ATM cell, forwards the ATM cell (iii) moves the first channel identifier to one of the second fields (e.g., in step 280).

Thereby, a pointer R cyclically in time slots (advancing R) points to one of the first fields (e.g., to field 110-R), pointer V moving towards pointer R (e.g., steps 230 and 235) points during a single time slot (e.g., R unchanged) to one or more of the first fields and approaches pointer R, and the processor looks up in fields which are pointed to by pointer V (e.g., step 220). Pointer R is used to measure TCU(s) for each AAL2 channel. Preferably, the processor determines whether the communication line is able to receive data or not by changing a counter variable (e.g., N) every time the processor forwards data (e.g., step 285). Conveniently, the counter variable is initiated at the beginning of each time slot (e.g., in step 215) to a value which corresponds to a data carrying capacity of the communication (e.g., $N_{slot}$) line during a single time slot. Preferably, the multiplexer sends default data (e.g., idle cells) to the communication line when the processor does not identify a channel identifier.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an improved method and apparatus for implementing an ATM AAL2 combined use Timer_CU. It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather then the foregoing detailed description.

We claim:

1. A method for implementing an ATM AAL2 combined use timer in an apparatus that is adapted to receive cells from channels and periodically in one time slot transmitting up to $N_{slot}$ cells to a communication line, at least one channel is an ATM AAL2 channel, the method comprising the steps of:
   (a) assigning a first pointer R and a second pointer V to schedule fields; and
   (b) in a time slot identified by said first pointer R,
      (One) assigning a counter to N to $N_{slot}$;
      (Two) looking up in the schedule fields identified by said second pointer V for channel identifiers "s" and if "s" is found checking if a channel identified by the "s" is an ATM AAL2 channel,
      (1) if a channel identified by the "s" is an ATM AAL2 channel, performing the sub-steps of:
         (1st) reading a CPS-PDU(s) from a channel memory, and if there are CPS-packets to be multiplexed and packed into CPS-PDU(s) then multiplexing and packing the CPS-Packets into the CPS-PDU(s);
         (2nd) checking if the CPS-PDU(s) is full;
            (1) if CPS-PDU(s) is full, converting CPS-PDU(s) to an ATM cell ATM(s) and jumping to a step of transmitting a cell from one channel identified by"s";
            (2) if CPS-PDU(s) is not full, checking if period Timer_CU(s) expires during the time slot identified by R;
               (a) if the answer is "yes" filling CPS-PDU(s) with PAD octets, converting CPS-PDU(s) to an ATM(s), resetting a measurement of Timer_CU(s) and jumping to a step of transmitting a cell from one channel identified by "s";
               (b) if the answer is "no", storing the CPS-PDU(s) in a channel memory, to be retrieved the next time "s" appears in the schedule fields, starting a measurement of Timer_CU(s) and jumping to step of moving channel identified "s" to a different schedule field;
      (2) if a channel identified by the "s" is not an ATM AAL2 channel, checking it the channel identified by "s" is able to provide cells during the time slot identified by R and if the answer is "no" jumping to step of looking up in the schedule fields identified by said second pointer V for channel identifiers "s";
      transmitting a cell from one channel identified by "s", moving said channel identifier "s" to a different schedule field identified by J, and changing said counter N;
   (c) repeating step 1(b) until N>$N_{slot}$ and when N>$N_{slot}$ changing said first pointer R and starting said step (ii) for a new time slot; and
   (d) changing said second pointer V and repeating step 1(b) if said second pointer V and said first pointer R are different.

2. The method of claim 1 wherein channel identifiers are initially written to said schedule fields according to a period P(s) of said channels; and
   wherein said second pointer V and said first pointer R are changed by modulo addition to the base M.

3. The method of claim 1 wherein channel identifiers that identify ATM AAL2 channels are moved with the following steps:
   calculating a period $P_R(s)$, the calculation is based upon at least one parameter of said channel from a parameter field;
   reading a variable Tempt(s) indicating if a Timer_CU(s) period is being measured, and reading a variable GAP(s) indicating when Timer_CU(s) expires;
   reading an entry L(s) from a link field identified by "s";
   writing said entry L(s) to a schedule field identified by V;

checking if GAP(s) is smaller than period $P_R$(s); if the answer is "yes" calculating J by: J:=$\text{mod}_M$(V+GAP(s)); if the answer is "no" calculating J by J:=$\text{mod}_M$(V+$P_R$(s));

reading a channel identifier from a schedule field identified by J;

writing said channel identifier to said link field identified by "s"; and writing "s" to the schedule field identified by J.

4. The method of claim 3 wherein some ATM AAL2 channels are characterized by a variable bit rate, each channel having a first period $P_s$(s), a second period $P_B$(s) and a third pointer U(s);

wherein $P_R$(s) is determined by $P_s$(s) when a first modulo difference between said first pointer R and said third pointer is larger than said first period $P_s$(s); and else $P_R$(s) is determined by the second period $P_B$(s).

5. The method of claim 4 comprising the further steps of: advancing said third pointer U(s) by said first period P(s) and if said first modulo difference is larger than a burst tolerance BT(s) of said channel, adjusting said third pointer U(s) to a second modulo difference between said first pointer R and said burst tolerance BT(s).

6. The method of claim 3 wherein if GAP(s)$\leq P_R$(s) then Tempt(s) is reset and updating GAP(s):GAP(s):=$P_R$(s)−GAP(s), and if GAP(s) is bigger than period $P_R$(s) then updating GAP(s):GAP(s):=GAP(s)−$P_R$(s).

7. The method of claim 3 further comprising of a first step of checking if during a preceding movement of channel identifier "s" a previous GAP(s) was smaller than a previous period $P_R$(s) and if the answer is "yes" then setting J to J:=$\text{mod}_M$(V+previous $P_R$(s)−previous GAP(s)) and jumping to step of reading a channel identifier from a first schedule field J.

8. A method for implementing an ATM AAL2 combined use timer in an apparatus that is adapted to receive cells from channels and periodically in one time slot transmitting up to $N_{slot}$ cells to a communication line, at least one channel is an ATM AAL2 channel, the method comprising the steps of:

(Nine) assigning a first pointer R and a second pointer V to schedule fields; and (b) in a time slot identified by said first pointer R, (One) assigning a counter N to $N_{slot}$;

(Two) looking up in the schedule fields identified by said second pointer V for channel identifiers "s" and if "s" is found checking if a channel identified by the "s" is an ATM AAL2 channel, (2) if a channel identified by the "s" is an ATM AAL2 channel, performing the sub-steps of:

(A) reading a CPS-PDU(s) from a channel memory, and if there are CPS-packets to be multiplexed and packed into CPS-PDU(s) then multiplexing and packing the CPS-Packets into the CPS-PDU(s);

(2nd) checking if the CPS-PDU(s) is full;

(1) if CPS-PDU(s) is full, converting CPS-PDU(s) to an ATM cell ATM(s) and jumping to a step of transmitting a cell from one channel identified by "s"; if a portion of a CPS-packet is packed into CPS-PDU(s) and a remaining portion of the CPS-packet is to be packed into a next CPS-PDU(s) then starting to measure a period Timer_CU(s);

(2) if CPS-PDU(s) is not full, checking if period Timer_CU(s) expires during the time slot identified by R;

(a) if the answer is "yes" filling CPS-PDU(s) with PAD octets, converting CPS-PDU(s) to an ATM(s), resetting a measurement of Timer_CU(s) and jumping to a step of transmitting a cell from one channel identified by "s";

(b) if the answer is "no", storing the CPS-PDU(s) in a channel memory, to be retrieved the next time "s" appears in the schedule fields, starting a measurement of Timer_CU(s) and jumping to step of moving channel identified "s" to a different schedule field;

(2) if a channel identified by the "s" is not an ATM AAL2 channel, checking it the channel identified by "s" is able to provide cells during the time slot identified by R and if the answer is "no" jumping to step of looking up in the schedule fields identified by said second pointer V for channel identifiers "s";

transmitting a cell from one channel identified by "s", moving said channel identifier "s" to a different schedule field identified by J, and changing said counter N;

(c) repeating step 1(b) until N>$N_{slot}$ and when N>$N_{slot}$ changing said first pointer R and starting said step (ii) for a new time slot; and (d) changing said second pointer V and repeating step 1(b) if said second pointer V and said first pointer R are different.

9. The method of claim 8 wherein channel identifiers are initially written to said schedule fields according to a period P(s) of said channels; and wherein said second pointer V and said first pointer R are changed by modulo addition to the base M.

10. The method of claim 9 wherein channel identifiers that identify ATM AAL2 channels are moved with the following steps:

calculating a period $P_R$(s), the calculation is based upon at least one parameter of said channel from a parameter field;

reading a variable Tempt(s) indicating if a Timer_CU(s) period is being measured, and reading a variable GAP(s) indicating when Timer_CU(s) expires;

reading an entry L(s) from a link field identified by "s";

writing said entry L(s) to a schedule field identified by V;

checking if GAP(s) is smaller than period $P_R$(s); if the answer is "yes" calculating J by: J:=$\text{mod}_M$(V+GAP(s)); if the answer is "no" calculating J by J:=$\text{mod}_M$(V+$P_R$(s));

reading a channel identifier from a schedule field identified by J;

writing said channel identifier to said link field identified by "s"; and writing "s" to the schedule field identified by J.

11. The method of claim 10 wherein some ATM AAL2 channels are characterized by a variable bit rate, each channel having a first period $P_s$(s), a second period $P_B$(s) and a third pointer U(s);

wherein $P_R$(s) is determined by $P_s$(s) when a first modulo difference between said first pointer R and said third pointer is larger than said first period $P_s$(s); and else $P_R$(s) is determined by the second period $P_B$(s).

12. The method of claim 11 comprising the further steps of: advancing said third pointer U(s) by said first period P(s) and if said first modulo difference is larger than a burst tolerance BT(s) of said channel, adjusting said third pointer U(s) to a second modulo difference between said first pointer R and said burst tolerance BT(s).

13. The method of claim 10 wherein if GAP(s)<$P_R$(s) then Tempt(s) is reset and updating GAP(s):GAP(s):=$P_R$(s)−GAP (s), and if GAP(s) is bigger than period $P_R(s)$ then updating GAP(s):GAP(s):=GAP(s)–$P_R$(s).

14. The method of claim 10 further comprising of a first step of checking if during a preceding movement of channel identifier "s" a previous GAP(s) was smaller than a previous period $P_R$(s) and if the answer is "yes" then setting J to J:=$\text{mod}_M$(V+previous $P_R$(s)–previous GAP(s)) and jumping to step of reading a channel identifier from a first schedule field J.

15. A system having an ATM AAL2 common use Timer__CU, the system is adapted to receive cells and CPS-packets from channels and periodically in one time slot transmit up to $N_{slot}$ cells to a communication line, at least one channel is an ATM AAL2 channel, the system comprising:

a packing and multiplexing unit, adapted to receive a plurality of CPS-Packets, multiplex and pack the plurality of CPS-packets to a plurality of CPS-PDUs;

a processor adapted to control the multiplexing and packing unit and adapted to transfer data cells from a plurality of channels to at least one data output;

a first table coupled to said processor for storing channel identifiers to schedule one of the following operations, for a finite number of time slots:

(a) (i) data transfer;

(b) (ii) multiplexing and packing of at least a portion of a CPS packet to a CPS-PDS;

(c) (iii) multiplexing and packing of at least a portion of a CPS packet to a CPS-PDS, and performing a data transfer;

wherein in the first table a sub-table defined by a first pointer R and a second pointer V is adapted to store channel identifiers indicating a location of data to be either transferred, packed and multiplexed, packed and multiplexed and transferred;

a second table coupled to said processor for storing parameters of channels identified by the channel identifiers;

wherein the processor cyclically (One) checks the sub table and if a channel identifier is found in the sub-table, (1) performs, either by itself or in conjunction with the multiplexing and packing unit, at least one operations (i)–(iii);

(2) reschedules a next operation out of operations (i)–(iii) according to the parameters from the second table and if a Timer__CU period is measured, also according to an expiration of the Timer__CU period;

(b) changes V to modify the sub-table and repeating step (a) until V and R are identical;

(Three) generates idle cells for filling up; and (Four) modifies R and repeats steps (a)–(c).

16. The system of claim 15 wherein consecutive time slots have substantially equal length and a Timer__CU period is as expressed as a distance between two time slots.

17. The system of claim 15 wherein if a channel identified by a channel identifier "s" is an ATM AAL2 channel the processor initiates a multiplexing and packing operation of CPS packets to a CPS__PDU(s), and checks if CPS-PDU(s) is filled during a time slot identified to R;

wherein if CPS-PDU(s) is full, CPS-PDU(s) is provided to the processor to be converted to an ATM cell and transferred by the processor;

wherein if CPS-PDU(s) is not full and a Timer__CU(s) period expired, the CPS__PDU(s) is filled with PAD octets, the processor converts CPS__PDU(s) to an ATM cell, transfers the ATM cell and resets a measurement of Timer__CU(s) period; and wherein if CPS-PDU(s) is not full and a Timer__CU(s) period did not expired, starting to measure a Timer__CU period and storing CPS__PDU(s) in a memory channel, to be retrieved a next time channel identifier "s" appears in the schedule fields.

18. The system of claim 17 wherein when the processor reschedules a next operation out of operations (i)–(iii) the processor:

calculates a period $P_R$(s), the calculation is based upon at least one parameter of said channel from a parameter field;

reads variables Tempt(s) and GAP(s) from the second table, Tempt(s) indicating if Timer__CU(s) period is being measured, and GAP(s) indicating when Timer__CU(s) expires; reads an entry L(s) from a link field within the second table identified by "s";

writes said entry L(s) to a first schedule field identified by V;

checks if GAP(s) is smaller than period $P_R$(s); if the answer is "yes" calculating J by: J=$\text{mod}_M$(V+GAP(s)); if the answer is "no" calculating J by J:=$\text{mod}_M$(V+$P_R$(s)); and reads a channel identifier from a first schedule field J.

19. The system of claim 18 wherein some ATM AAL2 channels are characterized by a variable bit rate, each channel having a first period $P_s$(s), a second period $P_B$(s) and a third pointer U(s); wherein the processor determines $P_R$(s) by $P_s$(s) when a first modulo difference between R and U(s) is larger than said first period $P_s$(s); and else $P_R$(s) is determined by the second period $P_B$(s).

20. The system of claim 19 wherein the processor further is adapted to:

advance U(s) by the first period P(s) and if the first modulo difference is larger than a burst tolerance BT(s) of CH(s), to adjust U(s) to a second modulo difference between said first pointer R and said burst tolerance BT(s).

21. The system of claim 20 wherein the processor checks a relationship between GAP(s) and $P_R$(s) and if GAP(s)≦$P_R$(s) then the processor resets Tempt(s) and updates GAP(s): GAP(s):=$P_R$(s)–GAP(s), and if GAP(s) is bigger than period $P_R$(s) then the processor updates GAP(s) GAP(s):=GAP(s)–$P_R$(s).

22. The system of claim 20 wherein the processor if further adapted to check if during a preceding movement of channel identifier "s" a previous GAP(s) was smaller than a previous period $P_R$(s) and if the answer is "yes" then the processor setts J to J:=$\text{mod}_M$(V+previous $P_R$(s)–previous GAP(s)) and reads a channel identifier from a schedule field identified by J.

23. A system comprising:

a channel memory adapted to store and provide CPS-packets of ATM AAL2 channels and to store and provide cells from other type of channels; the channel memory is adapted to store data, either in a cell form or in a CPS-packet form of S channels.

a multiplexing and packing unit, coupled to the channel memory, adapted to receive a plurality of CPS-packets and to pack and multiplex the plurality of CPS packets to a plurality of CPS-PDU:

a program memory adapted to store a code to be executed by a processor, the code has a time slot pointer R and an auxiliary pointer V;

a processor, coupled to the program memory, the processor is adapted to (i) control a multiplexing and packing operation of the multiplexing and packing unit, (ii) transfer data cells, (iii) control a multiplexing and packing of the multiplexing and packing unit, receive a CPS-PDU, convert a CPS-PDU to an ATM cell and to transfer the ATM cell; wherein the processor is adapted to handle up to $N_{slot}$ operations such as (i)–(iii) during a time slot identified by R;

a first plurality of S first fields for storing a period P(s) and a plurality of parameters for each the channel CH(s) of the S channels;

a second plurality of S second fields for storing link entries L(s) in some of the second fields;

a third plurality of M third fields for storing channel identifiers of CH(s), said third fields;

wherein during one time slot identified by R, R points to one of the third fields and V points to one or consecutively to more than one of the third fields;

wherein during one time slot said processor performs up to $N_{slot}$ times
  (a) looking up in at least one of the third fields, and if channel identifiers are stored in that third field, performs, either by itself or in conjunction with the multiplexing and packing unit, at least one operations (i)–(iii); and (b) reschedules a next operation out of operations (i)–(iii) according the parameters of a channel CH(s) and if a Timer_CU(s) period is measured, also according to an expiration of the Timer_CU(s) period.

* * * * *

UNITED STATES PATENT AND TRADEMARK OFFICE
CERTIFICATE OF CORRECTION

PATENT NO. : 6,603,766 B1  Page 1 of 1
APPLICATION NO. : 09/495412
DATED : January 31, 2000
INVENTOR(S) : Dovrat Zifroni et al.

It is certified that error appears in the above-identified patent and that said Letters Patent is hereby corrected as shown below:

Title page

Abstract Item (57), Line 4:
    Change "channel" to -- channels --.

In Column 16, Line 37, Claim 2
    Change "it" to -- if --.

In Column 18, Line 11, Claim 8
    Change "it" to -- if --.

In Column 20, Line 4, Claim 17
    Change "expired" to -- expire --.

In Column 20, Line 52, Claim 22
    Change "setts" to -- sets --.

In Column 20, Line 58, Claim 23
    Change "type" to -- types --.

Signed and Sealed this

Thirtieth Day of November, 2010

David J. Kappos
*Director of the United States Patent and Trademark Office*